United States Patent Office 3,552,974
Patented Jan. 5, 1971

3,552,974
PHOTOGRAPHIC SILVER HALIDE EMULSIONS CONTAINING STYRYL SENSITIZING DYES
Roy Arthur Jeffreys, Hatch End, England, assignor to Eastman Kodak Company, Rochester, N.Y., a corporation of New Jersey
No Drawing. Original application Jan. 3, 1966, Ser. No. 518,010, now Patent No. 3,506,655, dated Apr. 14, 1970. Divided and this application Sept. 10, 1969, Ser. No. 856,808
Int. Cl. G03c 1/08
U.S. Cl. 96—129
16 Claims

ABSTRACT OF THE DISCLOSURE

Styryl, hemicyanine, merocyanine, complex, oxamine and other cyanine dyes useful as sensitizers for photographic silver halide emulsions are prepared by reacting certain enamine compounds with an amino substituted aldehyde, a 2-alkylthioheterocyclic quaternary salt, a 2-(2-acetanilidovinyl) heterocyclic quaternary salt, a 2-(4-acetanilidobutadienyl) heterocyclic quaternary salt, an alkoxymethylene derivative of a ketomethylene heterocyclic compound or ethylisoformanilide.

This application is a division of my copending application Ser. No. 518,010, filed Jan. 3, 1966.

This invention relates to a novel process for making dye compounds useful as sensitizers for photographic silver halide emulsions, to the use of the dye compounds as sensitizers for photographic silver halide emulsions and to certain of the dye compounds as new compounds. The invention is particularly directed to the preparation of styryl, hemicyanine, merocyanine, complex, oxamine and other cyanine (e.g., symmetrical and unsymmetrical) dyes, to their use as sensitizers for photographic silver halide emulsions and to certain of the dye compounds as new compounds.

Styryl, hemicyanine, merocyanine and complex dyes are known types of photographic silver halide sensitizing dyes. These dyes are usually made by condensing a suitable cyclammonium quaternary salt with an appropriate intermediate under suitable conditions. For example the synthesis of certain styryl dyes is described by Brooker et al. U.S. Pat. No. 2,494,032, issued Jan. 10, 1950, the synthesis of certain hemicyanine dyes is described by White U.S. Pat. No. 2,369,509, issued Feb. 13, 1945, and the synthesis of certain merocyanines is described by Aubert and Knott U.S. Pat. No. 2,652,397, issued Sept. 15, 1953. These reactions are usually conducted in a suitable solvent in the presence of a basic condensing agent and at a temperature between room temperature and the reflux temperature of the solvent in the reaction mixture.

Oxamine (e.g., hemioxonol) and cyanine dyes wherein the meso carbon atom is substituted with an amino group are also known types of photographic silver halide sensitizing dyes. The synthesis of certain hemioxonol dyes is described in Keyes U.S. Pat. No. 2,186,608, issued Jan. 9, 1940. The synthesis of certain cyanine dyes wherein the meso carbon atom is substituted with an amino group is disclosed in British Pats. Nos. 684,650 and 719,238.

New methods for preparing photographic sensitizing dyes are desirable. Therefore, it is an object of my invention to provide a new process for preparing styryl, hemicyanine, merocyanine, other cyanine, complex and oxamine photographic sensitizing dyes.

Another object is to provide a process for preparing dyes which comprises reacting an enamine compound with a compound selected from the group consisting of an amino substituted aldehyde, a 2-alkylthioheterocyclic quaternary salt, a 2 - (2 - acetanilidovinyl)heterocyclic quaternary salt, a 2-(4-acetanilidobutadienyl)heterocyclic quaternary salt, an alkoxymethylene derivative of a ketomethylene heterocyclic compound and ethylisoformanilide.

Another object is to provide photographic sensitizing dyes made by the process of my invention.

A further object is to provide new photographic silver halide emulsions.

Other objects will become evident from a consideration of the following specification and claims.

The enamines used in the process of my invention have the formula:

I. 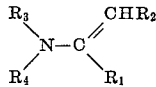

wherein $R_1$ is a hydrogen atom or an alkyl group,
$R_2$ is an alkyl group, or
$R_1$ and $R_2$ together complete a carbocyclic ring,
$R_3$ and $R_4$ each independently represent an alkyl, a substituted alkyl, an aryl or a substituted aryl group, or together represent the non-metallic atoms necessary to complete a 5- or 6-membered heterocyclic ring.

N-cyclopentenylpyrrolidine (1-[1-cyclopenten-1-yl]pyrrolidine), N-cyclohexenylpyrrolidine (1-[1-cyclohexen-1-yl]pyrrolidine), N-cyclopentenylpiperidine (1-[1-cyclopenten-1-yl]piperidine), N-cyclohexenylpiperidine (1-[1-cyclohexen-1-yl] piperidine), N-cyclopentylmorpholine (1-[1-cyclopenten-1-yl]morpholine) and N-cyclohexenylmorpholine (1-[1-cyclohexen-1-yl]morpholine) are representative of the enamine compounds having the Formula I.

In accordance with the novel process of my invention the enamine compounds having the Formula I can be condensed with a 2-alkylthioheterocyclic quaternary salt, a 2-(2-acetanilidovinyl)heterocyclic quaternary salt or a 2-(4-acetanilidobutadienyl)heterocyclic quaternary salt to form hemicyanine dyes. When N-cyclopentenylpyrrolidine which has the formula II. 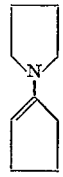

for example, is condensed with the quaternary salts just mentioned hemicyanines having the formula:

III. 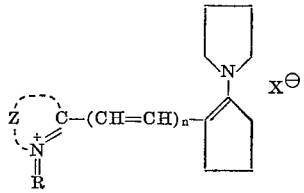

wherein R represents an alkyl group such as methyl, ethyl, propyl, isopropyl, butyl, isobutyl, amyl or hexyl, for example, allyl, and a substituted alkyl group such as β-hydroxyethyl, β-hydroxypropyl, γ-hydroxypropyl, δ-hydroxybutyl, β-acetoxyethyl, β-sulfoethyl, sulfopropyl, sulfobutyl or ethoxycarbonylmethyl, $n$ represents 1 or 2, $x^\ominus$ represents an acid anion such as the chloride, bromide, iodide, methyl sulfate, ethyl sulfate, thiocyanate, sulfonate, perchlorate, p-toluenesulfonate, benzenesulfonate, etc. and Z represents the non-metallic atoms necessary to complete a heterocyclic nucleus containing from five to six atoms in the heterocyclic ring, such as those selected from the group consisting of the thiazole series (e.g. thiazole, 4-methylthiazole, 4-phenylthiazole, 5-methylthiazole, 5-phenylthiazole, 4,5-dimehtylthiazole, 4,5 - diphenylthiazole, 4 - (2 - thienyl)thiazole, etc.), those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6 - bromobenzothiazole, 4 - phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the oxazole series (e.g. 4-methyloxazole, 5-methyloxazole, 5-phenyloxazole, 4,5-diphenyloxazole, 4-ethyloxazole, 4,5-dimethyloxazole, 5-phenyloxazole, etc.), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxaozle, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the thiazoline series (e.g., thiazoline, 4-methylthiazoline, etc.) are obtained.

The condensation reaction using the enamine compounds having the Formula I is preferably carried out by heating the reactants in an inert solvent, such as ethanol or acetic anhydride, in the absence of any basic compounds.

Hemicyanine compounds corresponding to those represented by Formula III can also be prepared by the use of another enamine compound, such as those specifically named hereinbefore, for example.

As noted hereinbefore in accordance with the process of my invention an enamine compound having the Formula I can be condensed with an alkoxymethylene derivative of a ketomethylene heterocyclic compound to form oxamine dye products. When N-cyclopentenylpyrrolidine is the enamine employed oxamine dye compounds having the formula:

IV.

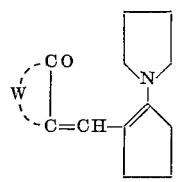

wherein W represents the non-metallic atoms necessary to complete a 5-membered heterocyclic ring selected from the class consisting of a 4-oxothiazolidine compound and a 2-oxazolin-5-one compound are obtained.

When other enamine compounds having the Formula I, such as those specifically named, are condensed with an alkoxymethylene derivative of a ketomethylene heterocyclic compound instead of N-cyclopentenylpyrrolidine oxamine dye compounds corresponding to those of Formula IV, but in which the enamine compound is different, are obtained. To illustrate when the enamine compound employed is N-cyclohexenylpyrrolidine the oxamine dye compounds obtained have the formula:

V.

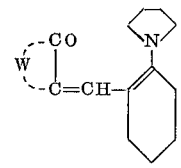

wherein W has the meaning previously assigned to it. The enamine group is joined to the methine carbon atom through the carbon atom sharing the double bond of the cyclopentenyl or cyclohexenyl nucleus which, prior to the condensation reaction, has a single hydrogen atom attached thereto.

As shown hereinafter the enamine compounds can be converted to immonium salts by treatment with acids and subsequently condensed in this state with intermediate compounds disclosed hereinafter to form photographic sensitizing dye compounds. Such condensations are preferably carried out in the presence of a basic condensation catalyst such as triethylamine.

When an enamine compound having the Formula I is converted to its immonium salt and condensed with one mole of an aromatic aldehyde having the formula:

VI.

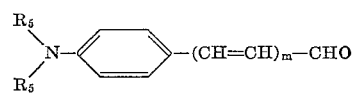

wherein each $R_5$ independently represents an alkyl group such as methyl, ethyl, propyl, isopropyl, butyl, isobutyl, amyl or hexyl, for example, or a hydroxyalkyl group such as $\beta$-hydroxyethyl, $\beta$-hydroxypropyl, $\gamma$-hydroxypropyl, or $\delta$-hydroxybutyl, for example, and $m$ is 0, 1, or 2, a styryl dye having the formula:

VII.

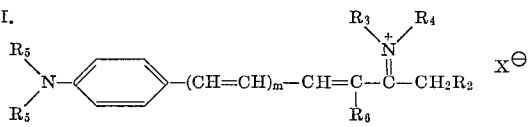

When an enamine having the Formula I is converted to its immonium salt and condensed with two moles of an aromatic aldehyde having the Formula VI, a complex styryl dye having the formula:

VIII.

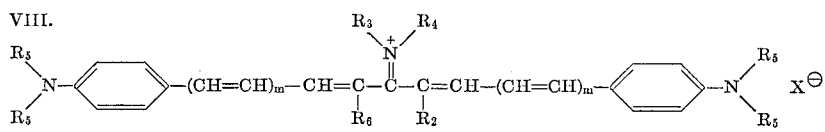

wherein $R_2$, $R_3$, $R_4$, $R_5$, $m$ and $X^\ominus$ have the meaning previously assigned to them, $R_6$ represents an alkyl group and wherein

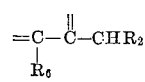

collectively can be a cyclopentylidene or a cyclohexylidene nucleus, is obtained.

The preparation of styryl dyes having the Formula VII by condensing an enamine immonium salt with one molar proportion of an aromatic aldehyde having the Formula VI is illustrated in Example 12. The preparation of complex styryl dyes having the Formula VIII by condensing an enamine immonium salt with two molar proportions of an aromatic aldehyde having the Formula VI is illustrated in Example 19.

In accordance with the process of my invention the enamine compounds in immonium salt form can be condensed, a basic catalyst being present in the reaction mixture, with a 2-alkyl-thioheterocyclic quaternary salt having the formula:

IX.

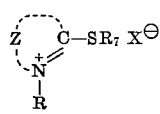

a 2-(2-acetanilidovinyl)heterocyclic quaternary salt having the formula:

X.

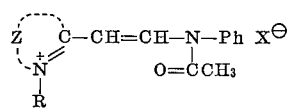

or a 2-(4-acetanilidobutadienyl)heterocyclic quaternary salt having the formula:

XI.

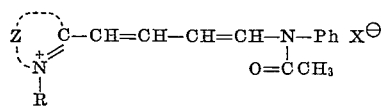

wherein R, Z and $X^{\ominus}$ have the meaning previously assigned to them and $R_7$ represents an alkyl group such as methyl, ethyl, propyl, isopropyl, butyl, isobutyl, amyl or hexyl, for example, to form hemicyanine dyes which when an immonium salt of N-cyclopentenylpyrrolidene is the enamine compound employed have the Formula III.

As previously stated the enamine compounds having the Formula I can be condensed with a 2-alkylthioheterocyclic quaternary salt, a 2-(2-acetanilidovinyl)heterocyclic quaternary salt or a 2-(4-acetanilidobutadienyl)heterocyclic salt, which have the Formulas IX, X and XI, respectively to form hemicyanine dyes.

Similarly in accordance with the process of my invention the enamine compounds in their immonium salt form, a basic catalyst being present in the reaction mixture, or non-salt form can be condensed with an alkoxymethylene derivative of a ketomethylene heterocyclic compound such as those having the formula:

XII.

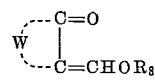

or an acetanilido-methylene derivative of a heterocyclic compound, such derivative having the formula:

XIII.

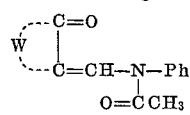

wherein W has the meaning previously assigned to it and $R_8$ represents an alkyl group such as methyl, ethyl, propyl, isopropyl, butyl, isobutyl, amyl or hexyl, for example, to form oxamine compounds having the formula:

XIV.

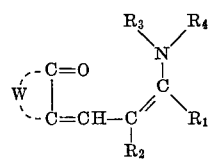

wherein W, $R_1$, $R_2$, $R_3$ and $R_4$ have the meaning previously assigned to them.

As only a limited number of alkoxymethylene derivatives of heterocyclic compounds having a ketomethylene group are available, an alternative two stage synthesis may be used. In this method the enamine immonium salt is first reacted with one molar proportion of ethylisoformanilide to give an intermediate having the formula:

XV.

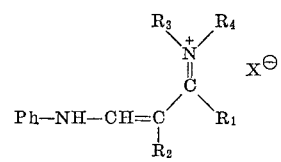

which can be acylated (e.g. acetylated) or used directly in the presence of acetic anhydride with ketomethylene heterocyclic compounds to form oxamine dye compounds, or with heterocyclic quaternary salts having a reactive methyl group to form hemicyanine dye compounds.

If two molar proportions of ethylisoformanilide are reacted with the enamine immonium salt an intermediate having the formula:

XVI.

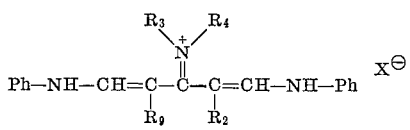

wherein $R_2$, $R_3$, $R_4$ and $X^{\ominus}$ have the meaning previously assigned to them and $R_9$ represents an alkyl group such as methyl, ethyl, propyl, isopropyl, butyl, isobutyl, amyl or hexyl for example, is obtained. This compound or its acetylated derivative reacts with a heterocyclic quaternary salt having a reactive methyl group to form symmetrical cyanine dyes.

The oxamine dye compounds formed as described herein which possess a 2-thio substituent can be alkylated with an alkyl ester in known fashion and further condensed to provide complex dyes such as those having the formulas:

XVII.

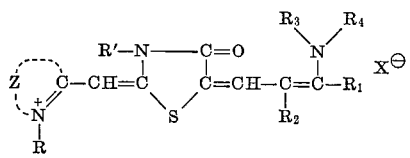

and

XVIII.

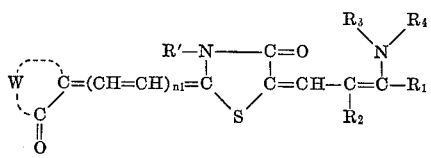

wherein R, $R_1$, $R_2$, $R_3$, $R_4$, W and Z have the meaning previously assigned to them, $n_1$ is 0 or 1 and R' represents an alkyl group such as methyl, ethyl, propyl, isopropyl, butyl, isobutyl, amyl or hexyl, for example, and a substituted alkyl group such as β-hydroxyethyl, β-hydroxypropyl, γ-hydroxypropyl, δ-hydroxybutyl, β-acetoxyethyl, β-sulfoethyl, sulfopropyl and sulfobutyl, for example, using the oxamine derived from rhodanine.

Merocyanine dyes derived from rhodanine and analogous thiones can be alkylated, in general, and condensed with the immonium salts of the enamines to give complex dyes. In the case of the perchlorate immonium salt of N-cyclopentenylpyrrolidine a dye is obtained having the formula:

XIX.

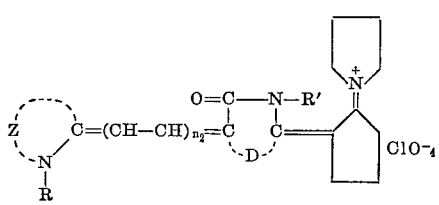

wherein R, R' and Z have the meaning previously assigned to them, $n_2$ is 0, 1 or 2 and D represents the nonmetallic atoms necessary to form a heterocyclic ring system such as a rhodanine ring.

When the basic enamine has the formula:

XX. 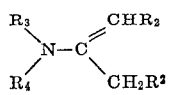

wherein $R_2$, $R_3$ and $R_4$ have the meaning previously assigned to them and $R^2$ represents a hydrogen atom, an alkyl group such as methyl, ethyl, propyl, isopropyl, butyl, isobutyl, amyl or hexyl, for example, or with $R_2$ represents the atoms necessary to complete a carbocyclic ring, it can react with two moles of a dye intermediate such as those having the formulas designated IX, X and XI, in acetic anhydride with sodium acetate to give the symmetrical cyanine dyes having the Formula XXI. The enamine may be condensed per se or as its immonium salt.

XXI. 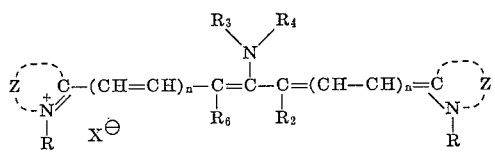

wherein R, $R_2$, $R_3$, $R_4$, $R_6$, Z, $n$ and $X^\ominus$ have the meaning previously assigned to them.

Similarly, unsymmetrical cyanine dyes can be prepared by first condensing the enamine per se or in its immonium salt form with a heterocyclic quaternary salt intermediate, such as those having the formulas designated IX, X, and XI to form a hemicyanine dye and then condensing the hemicyanine dye with a second intermediate such as a different heterocyclic quaternary salt intermediate, such as those having the formulas designated IX, X and XI, to form the cyanine dye.

Styryl dyes such as those having the Formula VII can be reacted with dye intermediates having an electrophilic carbon atom, such as the heterocyclic quaternary salts having the Formulas IX, X and XI, for example, to produce complex styryl dyes having the formula:

XXII. 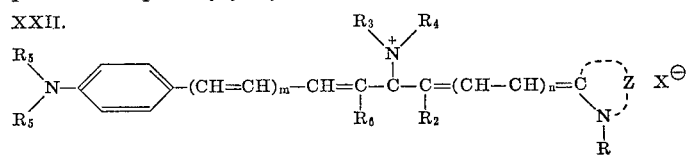

wherein R, $R_2$, $R_3$, $R_4$, $R_5$, $R_6$, Z, $m$, $n$, and $X^\ominus$ have the meaning previously assigned to them. Many of the styryl dyes having the formula just given are powerfully supersensitized by compounds such as Leucophor B. Other complex styryl dyes, i.e. those having the Formula VIII are disclosed herein.

Particularly useful dyes are obtained using the enamine N-cyclopentenylpyrrolidine per se or in its immonium salt form and my invention is particularly directed to the use of this enamine compound in the process of my invention. Many of the dye compounds obtained by the use of this enamine compound are powerful sensitizers for photographic gelatino-silver halide emulsions.

The dye compounds prepared in accordance with my invention sensitize photographic gelatino-silver halide emulsions, such as silver chloride, silver chlorobromide and silver bromoiodide emulsions, to as high as 790 m$\mu$. The results obtained using various dye compounds prepared in accordance with the process of my invention are set forth in the examples.

The following examples further illustrate my invention. The preparation of enamine immonium salts and the preparation of dyes and dye intermediates according to the invention using the enamines or their immonium salts is illustrated in the following examples.

EXAMPLE 1

N-cyclopentylidenepyrrolidinium perchlorate

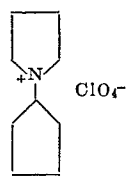

Perchloric acid (33 ml. of 60% aqueous solution) was added slowly to a cooled stirred solution of N-cyclopentenylpyrrolidine (27.4 grams) in acetone (100 ml.). The reaction mixture was allowed to reach room temperature, after which ether (25 ml.) was added, and the product was filtered off. It was obtained as colorless leaflets from ethanol in 32 grams (67%) yield, M.P. 229–231°.

EXAMPLE 2

N-(2-anilinomethylenecyclopentylidene) pyrrolidinium perchlorate

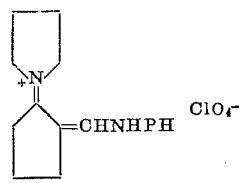

The compound of Example 1 (20.0 grams) and ethylisoformanilide (14.5 grams) were fused together by heating at 130° for ½ hour. The cooled product was stirred with acetone, and then filtered off. It was recrystallized from methanol-ether as orange prisms, M.P. 210°, in 25 grams (87%) yield.

EXAMPLE 3

3-ethyl-5-[2-(1 - pyrrolidinyl)cyclopentenylmethylene] - rhodanine

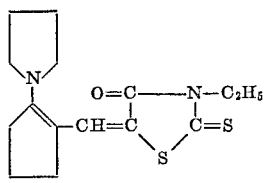

N-cyclopentenylpyrrolidine (4.1 grams) and 5-ethoxymethylene-3-ethyl-4-oxo-2-thionothiazolidine (6.5 grams) were warmed in ethanol (30 ml.), and after the reaction was complete the reaction mixture was cooled to effect precipitation of the dye product formed. The dye product was recrystallized from benezene in the form of maroon prisms, M.P. 226° C., in 5.7 grams (62%) yield. The dye compound thus obtained sensitized silver chlorobromide and bromoiodide emulsions to 640 m$\mu$ with peaks at 570 m$\mu$.

This dye was also prepared in 52% yield by heating (in the molar proportions indicated) the intermediate of Example 2 (1 mol.), 3-ethyl-4-oxo-2-thionothiazolidine (1 mol.), acetic anhydride (1 mol.) and triethylamine together (2 mol.) in ethanol.

EXAMPLE 4

3-ethyl-2-[2-(1 - pyrrolidinyl)cyclopentenyl] benzothiazolium iodide

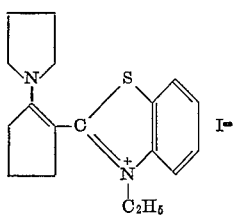

N-cyclopentenylpyrrolidine (2.7 grams) and 3-ethyl-2 - ethylthiobenzothiazolium - p - toluenesulfonate (7.9 grams) in ethanol (25 ml.) were refluxed together for 10 minutes. The reaction solution was poured into excess aqueous sodium iodide, and the product separated. It was recrystallized from ethanol-ether as chunky orange-brown prisms, M.P. 243–244° C. (decomp.), in 2.4 grams (28%) yield.

EXAMPLE 5

3-ethyl-2-{2-[2 - (1 - pyrrolidinyl)cyclopentenyl] - vinyl} benzoxazolium iodide

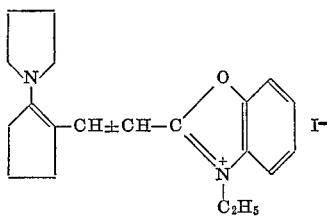

N-cyclopentenylpyrrolidine (2.7 grams) and 2-[-acetanilidovinyl]-3-ethyl-benzoxazolium iodide (8.7 grams) in ethanol (35 ml.) were refluxed together for 10 minutes after which the reaction mixture was chilled to precipitate the dye product formed. The dye product was filtered off from the chilled solution. After several recrystallizations from methanol it was obtained as bright blue prisms, M.P. 299° C. (decomp.) in 4.8 grams (55%) yield. The dye thus obtained sensitized silver chlorobromide and bromoiodide emulsions to 560 m$\mu$ with peaks at 515 m$\mu$.

EXAMPLE 6

3-ethyl-2-2'[2-(1-pyrrolidinyl)cyclopentenyl] vinylbenzothiazolium iodide

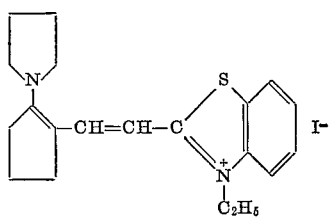

N-cyclopentenylpyrrolidine (2.7 grams) and 2-[2-acetanilidovinyl]-3-ethylbenzothiazolium iodide (9 grams) in ethanol (25 ml.) were shaken together at room temperature for ½ hour. The dye product formed was filtered off and recrystallized from ethanol to remove magenta and blue impurities. The orange dye was obtained as maroon leaflets, M.P. 297–299° C. with decomp. (darkens at 290° C.) in 2.1 grams (23%) yield.

EXAMPLE 7

Bis-(3-ethyl-2-benzothiazole)$\gamma,\epsilon$-ethylene - $\delta$ - pyrrolidinyl heptamethinecyanine iodide

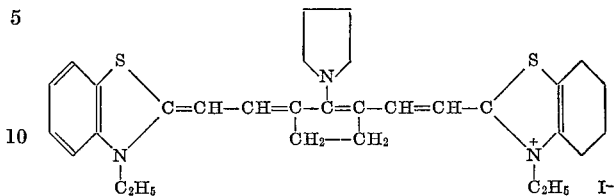

N-cyclopentenylpyrrolidine (0.7 gram), 2-[2-acetanilidovinyl]-3-ethylbenzothiazolium iodide (4.5 grams) and sodium acetate (0.8 gram) in acetic anhydride (25 ml.) were refluxed together for ¼ hour, and the resulting blue solution was chilled to precipitate the dye product formed. The dye product was filtered off, washed with ethanol and water, and recrystallized from methanol as moss green needles, M.P. above 345° C., in 1 gram (31%) yield. The dye compound thus obtained sensitized a silver chlorobromide emulsion to 790 m$\mu$ with a peak at 700 to 740 m$\mu$.

EXAMPLE 8

2 - (3 - ethoxycarbonylmethyl - 4 - oxo 2 - thioxo - 5 - thiazolidinylidene) - 3 - ethyl - 5 - {[2 - (1 - pyrrolidinyl)cyclopentenyl]methylene}-4-thiazolidinone

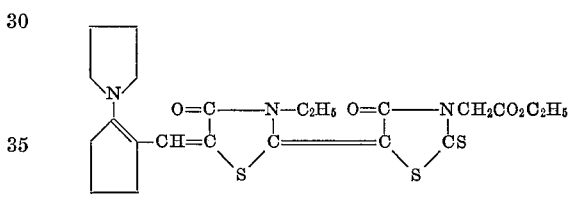

The dye of Example 3 (1.5 grams) and dimethyl sulfate (1 ml.) were heated on the steam-bath for 1 hour. To the mix were added 3-ethoxycarbonylmethyl-4-oxo-2-thioxothiazolidine (1.1 grams) and triethylamine (0.7 ml.) in ethanol (12 ml.). The resulting solution was refluxed for 10 minutes and then chilled to precipitate the dye product formed. The dye product was filtered off, washed with ethanol and then with acetone, and recrystallized from pyridine-ethanol as green microcrystals, M.P. 281–283° C. (decomp.), in 1.4 grams (58%) yield. The dye compound thus obtained sensitized a silver chlorobromide emulsion to 680 m$\mu$ with a peak at 630 m$\mu$.

EXAMPLE 9

2 - (3 - ethoxycarbonylmethyl - 4 - oxo 2 - thioxo - 5 - thiazolidinylidene - ethylidene) - 3 - ethyl - 5 - {[2 - (1 - pyrrolidinyl)cyclopentenyl]methylene} - 4 - thiazolidinone

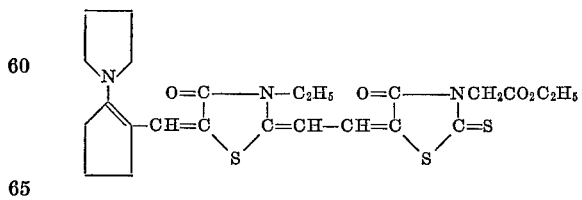

The dye of Example 3 (1.5 grams) and methyl sulfate (1 ml.) were heated on the steam-bath for 1 hour. To the mix were added 3-ethoxycarbonylmethyl-5-ethylidene-4-oxo-2-thioxothiazolidine (1.2 grams) and triethylamine (0.7 ml.) in ethanol (12 ml.). The solution was refluxed for 10 minutes and chilled. The product was filtered off, washed with ethanol and then with acetone, and recrystallized from pyridine-ethanol as green microcrystals, M.P. 254° C., in 0.5 gram (20%) yield.

EXAMPLE 10

3 - ethyl - 2 - (3 - ethyl-2-benzothiazolin-ylidenemethyl)- 5 - [2 - (1 - pyrrolidinyl)cyclopentenylmethylene] - 2-thiazolinium iodide

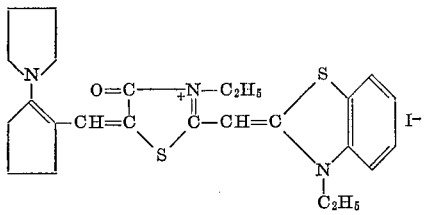

The dye of Example 3 (1.5 grams) and methyl sulfate (1 ml.) were heated on the steam-bath for 1 hour. To the mix were added 3-ethyl-2-methylbenzothiazolium iodide (1.5 grams) and triethylamine (0.7 ml.) in ethanol (12 ml.). The solution was refluxed for 10 minutes and then chilled to precipitate the dye compound formed. The dye product was filtered off, washed with ethanol, acetone and ether, and then recrystallized from methanol-ether as metallic green prisms, M.P. 286° C. (decomp.), in 1.6 grams (55%) yield. The dye compound thus obtained sensitized a silver bromoiodide emulsion to 660 mµ with a peak at 620 mµ.

EXAMPLE 11

2 - (2 - dicyanomethylene - 3 - ethoxycarbonylmethyl-4-oxothiazolid - 5 - ylidene)-3-ethyl-5-[2-(1-pyrrolidinyl)cyclopentenylmethylene]thiazolid-4-one

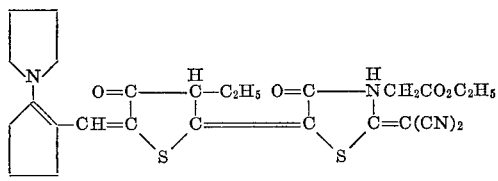

The dye of Example 8 (0.5 gram) and methyl sulfate (0.5 ml.) were heated on the steam-bath for 1 hour. To the mix were added malononitrile (0.07 gram) and triethylamine (0.14 ml.) in ethanol (10 ml.). The resulting solution was refluxed for 10 minutes, and chilled to precipitate the dye compound formed. The dye product was filtered off, washed with ethanol and then with acetone, and recrystallized from pyridine-ethanol as bright green needles, M.P. above 330° C., in 0.2 gram (38%) yield. The dye compound thus obtained sensitized a silver chlorobromide emulsion to 660 mµ with a peak at 610 mµ, and a silver bromoiodide emulsion with a peak at 590 mµ.

EXAMPLE 12

N - {2 - (4-dimethylaminobenzylidene)cyclopentylidene} pyrrolidinium perchlorate

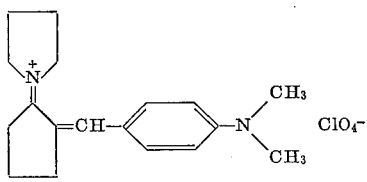

N - cyclopentylidenepyrrolidinium perchlorate (2.4 grams), p-dimethylaminobenzaldehyde (1.5 grams) and piperidine (1 drop) in ethanol (20 ml.) were refluxed together for ¼ hour and chilled to precipitate the dye compound formed. The dye product was filtered off and recrystallized from methanol as blue prisms, M.P. 198° C., in 1.4 grams (38%) yield.

EXAMPLE 13

3 - ethyl - 5-[(3-ethyl-2-benzothiazolinylidene)ethylene]- 4 - oxo - 2 - [2-(1-pyrrolidinyl)cyclopentenyl]-2-thiazolinium perchlorate

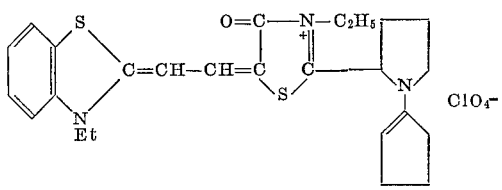

3 - ethyl-5-(3-ethylbenzothiazolin-2-ylidene)ethylidene- 4-oxo-2-thioxothiazolidine (0.87 gram) and methyl sulphate (0.8 ml.) were heated together on a steam-bath for ½ hour. To the mixture thus obtained were added N-cyclopentenylpyrrolidine (0.35 gram) and ethanol (15 ml.). The resulting solution was refluxed for ¼ hour, then cooled and excess aqueous sodium perchlorate was added to the cooled solution. The dye product formed was filtered off and recrystallized from pyridine-ethanol as red needles, M.P. 303° C. (decomp.), in 0.25 gram (15%) yield. The dye compound thus obtained sensitized a silver chlorobromide emulsion to 620 mµ with a peak at 575 mµ.

EXAMPLE 14

N - (2 - acetanilidomethylenecyclopentylidene)pyrrolidinium perchlorate

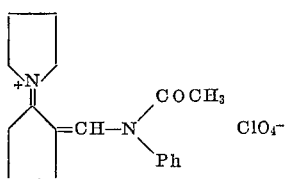

A mixture of the compound of Example 2 (1 gram), in acetic anhydride (15 ml.) was refluxed for 20 minutes. The solution was cooled and a little ether (3 ml.) was added. The dye product formed was filtered off and recrystallized from ethanol as straw needles, M.P. 204° C., in 0.8 gram (71%) yield.

EXAMPLE 15

N - (2,5 - dianilinomethylenecyclopentylidene)pyrrolidinium perchlorate

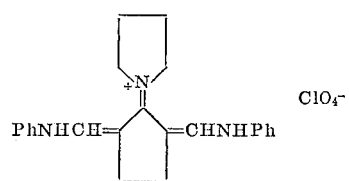

From the preparation of Example 2, when the crude product was dissolved in methanol-ether for recrystallization, there was a rather insoluble residue, insoluble residue (N - [2,5-dianilinomethylenecyclopentylidene]pyrrolidinium perchlorate) was recovered and recrystallized from pyridine-methanol as orange needles, M.P. 270–274° C. with decomposition, in 4 gram yield. It could be obtained in much better yield in an alternative synthesis by using 2 moles of ethylisoformanilide in the reaction of Example 2.

EXAMPLE 16

N-(2,5-diacetanilidomethylenecyclopentylidene) pyrrolidinium perchlorate

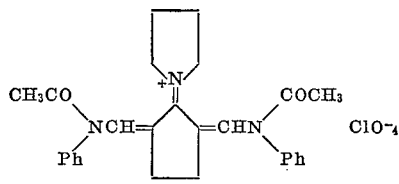

A mixture of the compound of Example 15 (5 grams) in acetic anhydride (40 ml.) was refluxed for 20 minutes. The solution was then cooled and ether (40 ml.) was added to the cooled solution. The product formed was filtered off and recrystallized from methanol-ether as buff needles, M.P. 233° C., in 2 grams (34%) yield.

The intermediate product obtained above (1 mol.) in dimethylformamide or acetic anhydride, with triethylamine or sodium acetate (2 mols.) and 3-ethyl-2-methylbenzothiazolium iodide (2 mols.) gave the dye of Example 7.

EXAMPLE 17

3-ethyl-5-(3-methyl-2-pyrrolidin-1'-ylcyclohexenylmethylene)-2-thiothiazolid-4-one

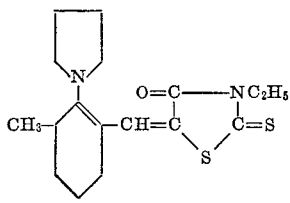

N-6-methylcyclohexenylpyrrolidine (4.9 grams) and 5-ethoxymethylene-3-ethyl-2-thiothiazolid-4-one (6.5 grams) were warmed together in ethanol (30 ml.) for 10 minutes, and water (5 ml.) was added. The reaction mixture was cooled and the dye product formed was filtered off from the chilled solution, washed with ethanol and water, and recrystallized from ethanol, and then from light petroleum. It was obtained as red platelets, M.P. 139° C., in 5.8 grams (58%) yield. The dye compound thus obtained sensitized a silver chlorobromide emulsion to 630 mμ with a peak at 580 mμ, and a bromoiodide emulsion to 650 mμ with a peak at 580 mμ.

EXAMPLE 18

3-ethyl-5-(2'-morpholinocyclohexenyl methylene)-2-thiothiazolid-4-one

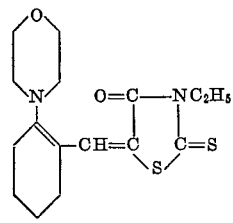

N-cyclohexenylmorpholine (1.7 grams) and 5-ethoxymethylene - 3-ethyl-2-thiothiazolid-4-one (2.2 grams) in acetic anhydride (12 ml.) were refluxed together for 10 minutes, and the resulting solution was chilled. The dye product formed was filtered off, washed with ethanol, and recrystallized from ligroin as red needles, M.P. 175° C., in 2.0 grams (59%) yield. 3-ethyl-5-morpholinomethylene-2-thiothiazolid-4-one was left as a residue from the ligroin solution of the product.

The dye compound thus obtained sensitized a silver chlorobromide emulsion to 630 mμ with a peak at 580 mμ, and a silver bromoiodide emulsion to 600 mμ with a peak at 580 mμ.

EXAMPLE 19

N-[2,5-di-(4-dimethylaminobenzylidene)cyclopentylidene]pyrrolidinimum perchlorate

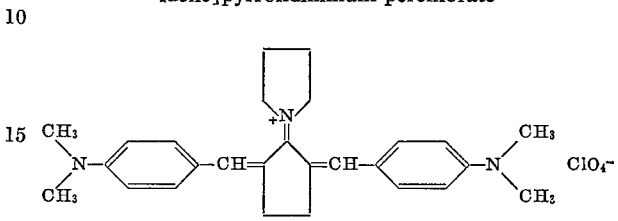

N - cyclopentylidenepyrrolidinium perchlorate (2.4 grams) and p-dimethylaminobenzaldehyde (4 grams) in acetic anhydride (30 ml.) were refluxed together for 15 minutes after which the reaction solution was cooled. Ether was added to the cooled solution to precipitate the reaction product. The dye product thus obtained was washed with methanol and recrystallized from acetic acid as bronze leaflets, M.P. 275° C., in 1 gram (20%) yield.

The dye compound thus obtained sensitized a silver chlorobromide emulsion to 680 mμ with a peak at 610 mμ and a silver bromoiodide emulsion to 650 mμ with a peak at 610 mμ.

EXAMPLE 20

N-[2,5-di-(4-dimethylaminocinnamylidene)cyclopentylidene]pyrrolidinium perchlorate

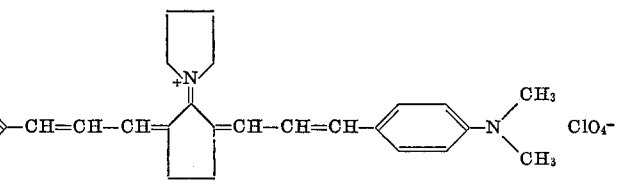

N - cyclopentylidenepyrrolidinium perchlorate (1.2 grams) and p-dimethylaminocinnamaldehyde (1.8 grams) in acetic anhydride (20 ml.) were refluxed together for 10 minutes. The reaction mixture was cooled and the reaction product was filtered off from the cooled reaction mixture, washed with acetic anhydride and ether, and recrystallized from pyridine-ether as a dull bronze powder, M.P. 198° C. (decomp.), in 1.7 grams (62%) yield.

EXAMPLE 21

2-phenyl-4-(2-pyrrolidin-1'-ylcyclopentenylmethylene)-2-oxazolin-5-one

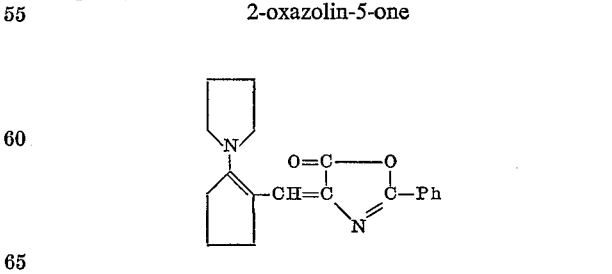

N - cyclopentylidenepyrrolidinium perchlorate (2.4 grams) and 4-ethoxymethylene-2-phenyl-2-oxazolin-S-one (2.2 grams) with triethylamine (1.4 ml.) in ethanol (20 ml.) were refluxed together for 10 minutes. The reaction mixture was cooled and the reaction product was filtered off from the chilled reaction mixture, washed with ethanol, and recrystallized from benzene-light petroleum as maroon prisms, M.P. 239–242° C., in 1 gram (32%) yield.

EXAMPLE 22

N-[2 - (4-dimethylaminobenzylidene) - 5-(3-ethylbenzoxazolin - 2-ylidene-ethylidene)cyclopentylidene]-pyrrolidinium perchlorate

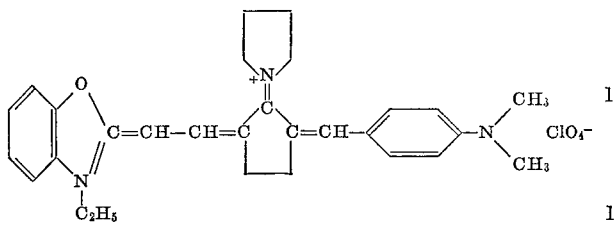

N-[2-(4-dimethylaminobenzylidene)cyclopentylidene]-pyrrolidinium perchlorate (Example 12) (1.2 grams) and 2-[2-acetanilidovinyl]-3-ethylbenzoxazolium iodide (1.4 grams) with sodium acetate (0.3 gram) in acetic anhydride (15 ml.) were refluxed together for 10 minutes. The dye product formed was filtered off, washed, and recrystallized from methanol as glossy sepia needles, M.P. 238° C., in 0.4 gram (23%) yield. The dye compound thus obtained sensitized a silver chlorobromide emulsion to 710 mμ with a peak at 630 mμ, and a silver bromoiodide emulsion to 670 mμ with a peak at 620 mμ. Supersensitization with Leucophor B extended the silver chlorobromide sensitization to 740 mμ with a peak at 640 mμ.

EXAMPLE 23

N - [21(4 - dimethylaminobenzylidene)-5-(3-ethylbenzothiazolin - 2 - ylidene - ethylidene)cyclopentylidene]pyrrolidinium perchlorate

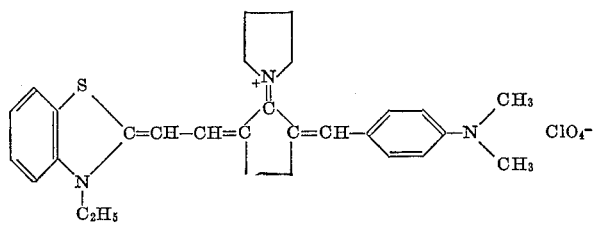

N-[2 - (4 - dimethylaminobenzylidene)cyclopentylidene] pyrrolidinium perchlorate (Example 12) (1.2 grams) and 2 - [2 - acetanilidovinyl] - 3 - ethylbenzothiazolium iodide (1.5 grams) with sodium acetate (0.3 gram) in acetic anhydride (15 ml.) were refluxed together for 10 minutes. The dye product formed was filtered off, washed, and recrystallized from ethanol-ether as sepia needles, M.P. 250° C., in 0.5 gram (28%) yield.

The dye compound thus obtained sensitized a silver chlorobromide emulsion to 720 mμ with peaks at 630 and 680 mμ, and was supersensitized by Leucophor B to give sensitizations to 770 mμ with a peak at 680 mμ.

The foregoing examples are intended to be illustrative and not limitative of my invention. Thus while the process of my invention has been illustrated primarily with reference to the use of N-cyclopentenylpyrrolidine it will be understood that any of the other enamine compounds, such as the other 6 enamine compounds specifically named herein can be used in place of N-cyclopentenylpyrrolidine. This would apply to Examples 1, 3, 4, 5, 6, 7, 12, 13, 19, 20 and 21, for example. Likewise the other enamine compounds, such as those specifically disclosed, can be used in place of the particular enamine compounds employed in Examples 17 and 18.

Ethanol, propanol, isopropanol, 1,4-dioxane, pyridine and quinoline are illustrative of the inert organic solvents that can be used to advantage in carrying out the process of my invention. Basic condensation catalysts or agents that can be employed in the condensation of an enamine immonium salt with an intermediate to form a dye include organic tertiary amines, such as the trialkylamines, e.g., triethylamine, tripropylamine, triisopropylamine, tributylamine, etc., the N,N-diakylanilines e.g., N,N - dimethylaniline, N,N - diethylaniline, etc., the N-alkylpiperidines, e.g., N-methylpiperidine, N-ethylpiperidine, etc.

The sensitizing dyes described herein are used to advantage in manufacturing photographic silver halide emulsions, serving to alter the sensitivity thereof. The type of silver halide emulsions that are sensitized with my dyes include any of those prepared with hydrophilic colloids that are known to be satisfactory for dispersing silver halides, for example, emulsions comprising materials such as, gelatin, albumin, agar-agar, gum arabic, alginic acid, etc., and hydrophilic synthetic resins such as polyvinyl alcohol, polyvinyl pyrrolidone, cellulose ethers, partially hydrolyzed cellulose acetate and the like.

In the preparation of the photographic emulsions, the dyes are advantageously incorporated in the finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials.

The concentration of the dyes in the emulsion can be varied widely, i.e., from about 5 to about 100 mg. per liter of flowable emulsion. The specific concentration will vary according to the type of light-sensitive material in the emulsion and according to the effects desired. The suitable and most economical dye concentration for any given emulsion will be apparent to those skilled in the art upon making the tests and observations customarily used in the art of emulsion making.

To prepare a gelatino-silver halide emulsion sensitized with one of the sensitizing dyes disclosed herein, the following procedure is satisfactory: A quantity of the dye is dissolved in a suitable solvent and the volume of this solution containing from 5 to 100 mg. of dye is slowly added to about 1000 cc. of the gelatino-silver halide emulsion. With most of the dyes, 10 to 20 mg. of dye per liter of emulsion suffice to produce the maximum sensitizing effect with the ordinary gelatino-silver bromide (including bromoiodide and chlorobromide) emulsions. With fine grain emulsion, which includes most of the ordinary employed gelatino-silver chloride emulsions, somewhat larger concentrations of the dye may be necessary to secure optimum sensitizing effect, while the preceding has dealt with gelatino emulsions, it will be understood that these remarks apply generally to any emulsions wherein part or all of the gelatin is replaced by another suitable hydrophilic colloid such as mentioned above.

The above statements are only illustrative and are not to be understood as limiting the invention in any sense, as it will be apparent that the dyes can be incorporated by other methods in many of the emulsions employed in the art. For instance, the dyes can be incorporated by bathing a plate or film upon which the emulsion has been coated, in the solution of the dye in an appropriate solvent.

Although the invention has been described in considerable detail with particular reference to certain preferred embodiments thereof, variations and modifications can be effected within the spirit and scope of the invention as described hereinbefore and as defined in the appended claims.

I claim:
1. A photographic silver halide emulsion containing a styryl dye compound having the general formula:

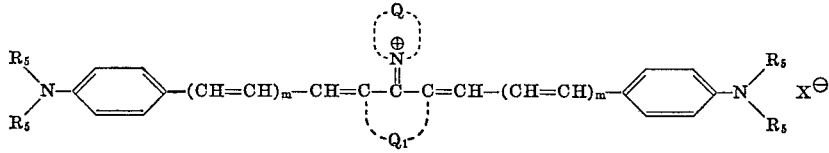

wherein each $R_5$ independently represents a member selected from the class consisting of an alkyl group having 1 to 6 carbon atoms and a monohydroxyalkyl group having 2 to 4 carbon atoms, Q represents the non-metallic atoms necessary to complete a member selected from the class consisting of pyrrolidyl, piperidyl and morpholinyl, $Q_1$ represents the non-metallic atoms necessary to complete a member selected from the class consisting of the cyclopentylidene nucleus and the cyclohexylidene nucleus, $m$ represents 0, 1 or 2 and $X^{\ominus}$ represents an acid anion.

2. A photographic silver halide emulsion in accordance with claim 1 wherein Q represents the non-metallic atoms necessary to complete the pyrrolidyl nucleus and $Q_1$ represents the non-metallic atoms necessary to complete the cyclopentylidene nucleus.

3. A photographic silver halide emulsion in accordance with claim 1 wherein Q represents the non-metallic atoms necessary to complete the pyrrolidyl nucleus and $Q_1$ represents the non-metallic atoms necessary to complete the cyclohexylidene nucleus.

4. A photographic silver halide emulsion in accordance with claim 1 wherein Q represents the non-metallic atoms necessary to complete the piperidyl nucleus and $Q_1$ represents the non-metallic atoms necessary to complete the cyclopentylidene nucleus.

5. A photographic silver halide emulsion in accordance with claim 1 wherein Q represents the non-metallic atoms necessary to complete the piperidyl nucleus and $Q_1$ represents the non-metallic atoms necessary to complete the cyclohexylidene nucleus.

6. A photographic silver halide emulsion in accordance with claim 1 wherein Q represents the non-metallic atoms necessary to complete the morpholinyl nucleus and $Q_1$ represents the non-metallic atoms necessary to complete the cyclopentylidene nucleus.

7. A photographic silver halide emulsion in accordance with claim 1 wherein Q represents the non-metallic atoms necessary to complete the morpholinyl nucleus and $Q_1$ represents the non-metallic atoms necessary to complete the cyclohexylidene nucleus.

8. A photographic silver halide emulsion in accordance with claim 1 wherein the styryl dye compound is N-[2,5-di-(4-dimethylaminobenzylidene) - cyclopentylidene]pyrrolidinium perchlorate.

9. A photographic element comprising a support coated with at least one layer containing a photographic silver halide emulsion containing a styryl dye compound having the general formula:

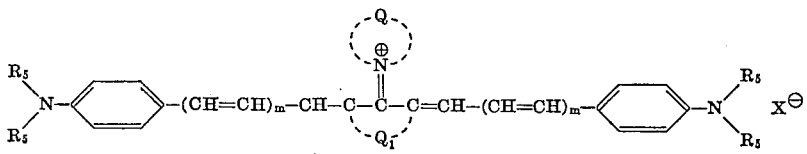

wherein each $R_5$ independently represents a member selected from the class consisting of an alkyl group having 1 to 6 carbon atoms and a monohydroxyalkyl group having 2 to 4 carbon atoms, Q represents the non-metallic atoms necessary to complete a member selected from the class consisting of pyrrolidyl, piperidyl and morpholinyl, $Q_1$ represents the non-metallic atoms necessary to complete a member selected from the class consisting of the cyclopentylidene nucleus and the cyclohexylidene nucleus, $m$ represents 0, 1 or 2 and $X^{\ominus}$ represents an acid anion.

10. A photographic element in accordance with claim 9 wherein Q represents the non-metallic atoms necessary to complete the pyrrolidyl nucleus and $Q_1$ represents the non-metallic atoms necessary to complete the cyclopentylidene nucleus.

11. A photographic element in accordance with claim 9 wherein Q represents the non-metallic atoms necessary to complete the pyrrolidyl nucleus and $Q_1$ repreesnts the non-metallic atoms necessary to complete the cyclohexylidene nucleus.

12. A photographic element in accordance with claim 9 wherein Q represents the non-metallic atoms necessary to complete the piperidyl nucleus and $Q_1$ represents the non-metallic atoms necessary to complete the cyclopentylidene nucleus.

13. A photographic element in accordance with claim 9 wherein Q represents the non-metallic atoms necessary to complete the pyrrolidyl nucleus and $Q_1$ represents the non-metallic atoms necessary to complete the cyclohexylidene nucleus.

14. A photographic element in accordance with claim 9 wherein Q represents the non-metallic atoms necessary to complete the morpholinyl nucleus and $Q_1$ represents the non-metallic atoms necessary to complete the cyclopentylidene nucleus.

15. A photographic element in accordance with claim 9 wherein Q represents the non-metallic atoms necessary to complete the morpholinyl nucleus and $Q_1$ represents the non-metallic atoms necessary to complete the cyclohexylidene nucleus.

16. A photographic element in accordance with claim 9 wherein the styryl dye compound is N-[2,5-di-(4-dimethylaminobenzylidene)-cyclopentylidene]pyrrolidinium perchlorate.

References Cited

UNITED STATES PATENTS 3,482,978  12/1969  Fumia et al. _____ 96—106

J. TRAVIS BROWN, Primary Examiner

U.S. Cl. X.R.

260—240.9

PO-1050
(5/69)

UNITED STATES PATENT OFFICE
CERTIFICATE OF CORRECTION

Patent No. 3,552,974    Dated 5 January 1971

Inventor(s) Roy A. Jeffreys

It is certified that error appears in the above-identified patent and that said Letters Patent are hereby corrected as shown below:

In the Claims:

Claim 13, line 66, change the word "pyrrolidyl" to read --- piperidyl ---.

Claim 11, line 56, the word "repreesnts" is misspelled, and should read --- represents ---.

Signed and sealed this 6th day of April 1971.

(SEAL)
Attest:

EDWARD M. FLETCHER, JR.            WILLIAM E. SCHUYLER, J
Attesting Officer                  Commissioner of Patent